(12) United States Patent
Balistreri

(10) Patent No.: US 9,820,478 B1
(45) Date of Patent: Nov. 21, 2017

(54) ANIMAL DETERRENT SPIKED-STRIP ASSEMBLY

(71) Applicant: Joseph W. Balistreri, Delray Beach, FL (US)

(72) Inventor: Joseph W. Balistreri, Delray Beach, FL (US)

( * ) Notice: Subject to any disclaimer, the term of this patent is extended or adjusted under 35 U.S.C. 154(b) by 0 days.

(21) Appl. No.: 15/289,731

(22) Filed: Oct. 10, 2016

(51) Int. Cl.
*A01M 29/30* (2011.01)
*A01M 29/32* (2011.01)

(52) U.S. Cl.
CPC ............. *A01M 29/30* (2013.01); *A01M 29/32* (2013.01)

(58) Field of Classification Search
CPC ........ A01M 29/30; A01M 29/32; A01G 13/10
USPC ........ 119/712; 43/77, 79; 52/101; 256/1, 14, 256/18; 404/34–36, 6
See application file for complete search history.

(56) References Cited

U.S. PATENT DOCUMENTS

| | | | |
|---|---|---|---|
| 719,509 A | 6/1902 | Rimbey | |
| 915,975 A | 12/1908 | Lillegren | |
| 2,142,371 A | 6/1938 | Peles | |
| 3,407,550 A | 1/1967 | Shaw | |
| 5,451,239 A | 9/1995 | Sewell et al. | |
| 5,488,981 A | 2/1996 | Burkhart | |
| 5,528,858 A * | 6/1996 | Omdahl | A01M 29/30 47/32 |
| 5,628,079 A * | 5/1997 | Kizemchuk | A47C 3/16 297/183.5 |
| 6,095,091 A * | 8/2000 | Byrne | A01K 15/02 119/712 |
| 7,757,449 B2 * | 7/2010 | Portoles Ibanez | E04F 15/02016 404/35 |
| 8,824,123 B2 | 9/2014 | Hickox | |
| 9,107,400 B1 | 8/2015 | Alptekin | |
| 2003/0208967 A1 * | 11/2003 | Riddell | A01M 29/32 52/101 |
| 2007/0271859 A1 * | 11/2007 | Scheirs | E01F 13/12 52/101 |
| 2008/0277994 A1 * | 11/2008 | Gray | A01K 1/035 297/463.2 |
| 2011/0131866 A1 * | 6/2011 | Everett | A01M 29/30 43/77 |

(Continued)

FOREIGN PATENT DOCUMENTS

| | | | | |
|---|---|---|---|---|
| DE | 29601419 U1 * | 6/1997 | ............ | A01M 29/32 |
| DE | 29911702 U1 * | 3/2000 | ......... | A01G 13/0268 |
| DE | 102009054775 A1 * | 6/2011 | ............ | A01M 29/30 |

(Continued)

*Primary Examiner* — David Parsley
*Assistant Examiner* — Danielle Clerkley
(74) *Attorney, Agent, or Firm* — Mark C. Johnson; Johnson | Dalal

(57) ABSTRACT

An animal deterrent spiked-strip assembly having a strip body that defines a plurality of substantially planar, unitary, and flexible body sections, wherein each body section hingedly couples to one another about a joint and includes an upper surface, a bottom surface opposing the upper surface, a front end, a rear end, a left side, and a right side. The strip assembly also includes a plurality of polymer-based spikes, each with a base coupled to the upper surface of each of the body sections, a rounded tip opposing the base, and of a conical shape, the plurality of polymer-based spikes arranged on the respective body sections in a uniform and tightly spaced configuration.

15 Claims, 13 Drawing Sheets

(56) References Cited

U.S. PATENT DOCUMENTS

2011/0214338 A1\* 9/2011 Neumann ............. A01M 23/36
43/77

FOREIGN PATENT DOCUMENTS

| FR | 2693080 | A1 \* | 1/1994 | ............ A01M 29/32 |
| FR | 2730383 | A1 \* | 8/1996 | ............ A01M 29/32 |
| GB | 2380388 | | 4/2003 | |
| ZA | WO 0078137 | A1 \* | 12/2000 | ............ A01G 13/10 |

\* cited by examiner

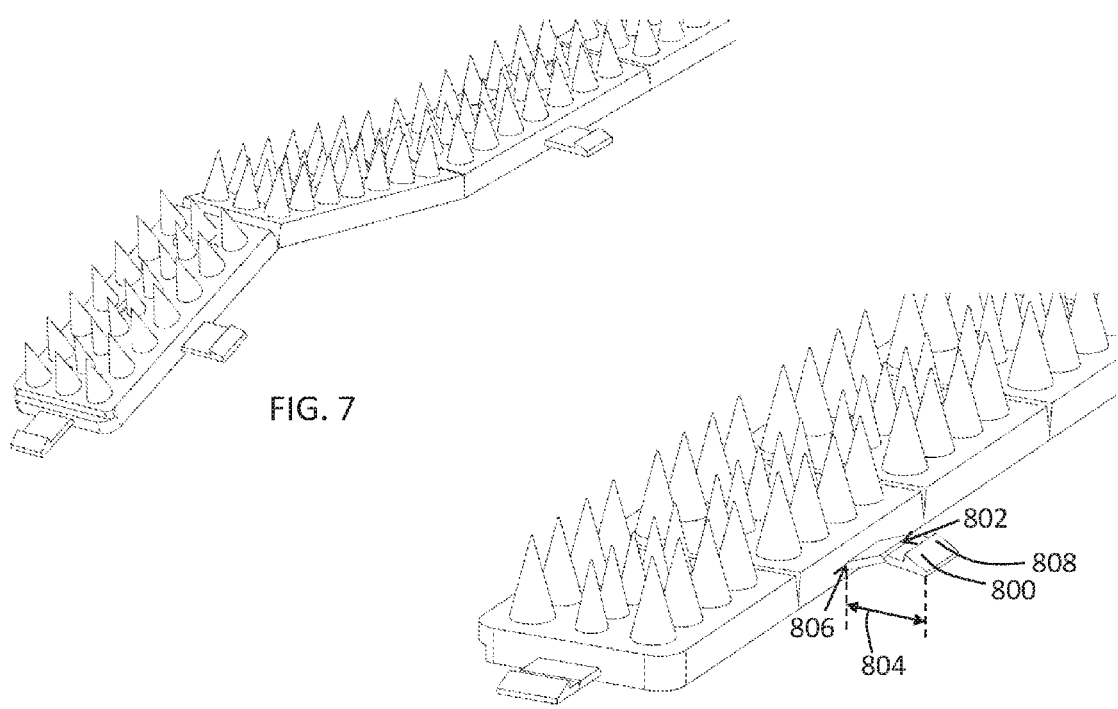

ANIMAL DETERRENT SPIKED-STRIP ASSEMBLY

FIELD OF THE INVENTION

The present invention relates generally to removable spiked strips and, more particularly, relates to one or more removable spiked strips used to deter animals from crossing transversely there-on or there-over.

BACKGROUND OF THE INVENTION

Deterring animals, particularly wild or feral animals, from entering a particular area or location is problematic for many individuals, specifically home owners and residents. Whether it be preventing animals from entering a portion of an individual's home (e.g., attic), an individual's swimming pool, or other area, many individuals are desirous to prevent, or at the very least deter, animals from entering these areas in a safe, effective, and cost-efficient way. One method of deterring animals includes the timely and costly process of setting traps, which may have little to no success. Another method includes employing the use of chemical sprays, which can be messy, hazardous to the individual and/or public, cause damage to the surface to which it is applied, and may have a limited applicability to only certain species of animals. As such, one known method of deterring animals includes the use of removable spiked mats.

There are a variety of known spiked mats. Some of these mats are designed to puncture the tires of a vehicle or intentionally injure an animal, so they include spikes of a very rigid material, e.g., steel, and that are very sharp. Such strips would not be conducive to act as a barrier or deterrent for animals for many users because said strips would likely cause severe injuries to the animal(s)—causing other ancillary problems—and are relatively cumbersome and difficult to transport and install. More importantly, such strips would also be prone to causing injuries to the user or passerbyers. As such, many users desire a removable spiked strip that effectively deters animals from entering a particular area of potentially varying dimensions, with varying surface placement topography, and does so in a humane or non-injurious manner.

Some known devices attempt to fulfill or remedy some of the above problems by employing a removable strip with plastic spikes having rounded tips tightly spaced apart from one another in a uniform fashion and having uniform lengths. Similar to the above lethal or more injurious spike mats, however, those spiked mats designed to be non-injurious are limited in shape, size, and application. Said another way, those mats are designed for a particular purpose and application, and have a spiked configuration conducive for deterring a particular species of animal.

Another type of known spiked mat that is removable is described in International Publication WO 00/78137 (Bushell, Roger). Similar to the above mats, however, this mat is provided in uniform sizes and shapes and spiked configurations. While it does provide for the ability to joint multiple mats together, it does not sufficiently accommodate or contour to placement surfaces of varying topographies. Moreover, said mat also leaves exposed the connecting elements (labeled in said reference as numeral 52) without any spikes, wherein said connecting elements 52 are designed to join multiple mats together. As such, said connecting elements 52 problematically provide a means for animals to tamper with and/or move the mat out of its designated area.

Therefore, a need exists to overcome the problems with the prior art as discussed above.

SUMMARY OF THE INVENTION

The invention provides an animal deterrent spiked-strip assembly that overcomes the hereinafore-mentioned disadvantages of the heretofore-known devices and methods of this general type and that provides a versatile and safe device that will deter multiple species of animals, over a variety of different ground surface topographies.

With the foregoing and other objects in view, there is provided, in accordance with the invention, an animal deterrent spiked-strip assembly that has a strip body, defining a plurality of substantially planar, unitary, and flexible body sections, each body section hingedly coupled to one another about a joint and including an upper surface, a bottom surface opposing the upper surface, a front end, a rear end, a left side, and a right side and includes a plurality of polymer-based spikes, each with a base coupled to the upper surface of each of the body sections, a rounded tip opposing the base, and of a conical shape, the plurality of polymer-based spikes arranged on the respective body sections in a uniform and tightly spaced configuration.

In accordance with a further feature of the present invention, each of the body sections define a plurality of apertures, each respectively interposed between two of the plurality of polymer-based spikes.

In accordance with another feature, an embodiment of the present invention includes a flexible removable strip connector having a first end with a first nodule disposed thereon and a second end, opposite the first end of the removable strip connector, with a second mushroom-shaped nodule disposed thereon, wherein the first and second mushroom-shaped nodules each with a first thickness greater than a diameter of each of the plurality of apertures. In one embodiment, the bottom surface of one of the plurality of body sections defines a channel sized to receive and house a width and a thickness of a length of the removable strip connector. In another embodiment, the first and second mushroom-shaped nodules each have a second thickness less than the first thickness of the respective first and second mushroom-shaped nodules and substantially equal to the diameter of each of the plurality of apertures.

In accordance with yet another feature, an embodiment of the present invention includes a second strip body that defines a plurality of substantially planar, unitary, and flexible second body sections, each second body section hingedly coupled to one another about a joint, and defines a plurality of second body apertures, and includes an upper surface, a bottom surface opposing the upper surface of the second body section, a front end, a rear end, and a left side, and a right side. The second strip body also includes a second plurality of polymer-based spikes, each with a base coupled to the upper surface of each of the second body sections, a blunt tip opposing the base of the second plurality of polymer-based spikes, and of a conical shape, the second plurality of polymer-based spikes arranged on the respective body sections in a uniform and tightly spaced configuration and two of the second plurality of polymer-based spikes flanking one of the plurality of second body apertures. Beneficially, the strip body and the second strip body are removably coupled together with the removable strip connector.

In accordance with a further feature of the present invention, the first mushroom-shaped nodule is interposed between the upper surface of one of the plurality of body sections of the strip body and the tips of the two of the plurality of polymer-based spikes defining one of the plurality of apertures interposed therein-between and the second mushroom-shaped nodule is interposed between the upper surface of one of the plurality of second body sections of the second strip body and the tips of the two of the second plurality of polymer-based spikes defining one of the second plurality of apertures interposed therein-between.

In accordance with an additional feature, an embodiment of the present invention also includes the removable strip connector having an effective length separating a first central axis defined by the first mushroom-shaped nodule and a second central axis defined by the second mushroom-shaped nodule, wherein the effective length is of a same value of a length separating a center axis defined by the one of the plurality of apertures on the strip body and a center axis defined by the one of the second plurality of apertures on the second strip body when the strip body and the second strip body are removably coupled together.

In accordance with a further feature, another embodiment of the present invention includes one of the plurality of body sections of the strip body having a snap tab having a proximal end hingedly coupled to the left side of the one of the plurality of body sections and a distal end, opposite the proximal end, the snap tab having a flange disposed along a tab length separating the proximal and distal ends of the snap tab. The snap tab may include a hinge disposed along the tab length separating the proximal end of the snap tab and the flange of the snap tab.

In accordance with yet another feature, an embodiment of the present invention also includes the snap tab having a hinge disposed along the tab length separating the proximal end of the snap tab and the flange of the snap tab.

In accordance with another feature, an embodiment of the present invention also includes the one of the plurality of body sections of the strip body having a tab channel defined at least partially by the right side of the one of the plurality of body sections and sized to receive and house the snap tab and an upper aperture defined by the upper surface of the one of the plurality of body sections and spatially coupled with the tab channel, the upper aperture sized to receive the flange of the snap tab.

In accordance with yet another feature, an embodiment of the present invention also includes the one of the plurality of the body sections of the strip further including a recessed wall shaped to receive the flange of the snap tab and disposed within the tab channel, the tab channel including a tab channel length separating a distal end of the tab channel and a proximal end of the tab channel, the proximal end of the tab channel opposing the distal end of the tab channel and an overhang member disposed on the right side of the one of the plurality of body sections and having a distal terminal end, wherein the tab length equals the length separating the distal end of the tab channel and the distal terminal end of the overhang member.

In accordance with a further feature of the present invention, an animal deterrent spiked-strip assembly has been disclosed that also includes a first strip body and a second strip body, each independent of another and respectively (i) of substantially planar profile, (ii) of a flexible material, (iii) having an upper surface, a bottom surface opposing the upper surface, a front end, a rear end, a left side, and a right side opposing the left side, and (iv) defining an aperture aligned with one another. The body may also include a plurality of polymer-based spikes coupled to the upper surface of the respective first strip body and a second strip body, wherein each perpendicularly extend from the substantially planar profile of the respective first strip body and second strip body to which the plurality of polymer-based spikes are attached and spanning conically to a blunt tip and are arranged on the respective body sections in a uniform and tightly spaced configuration. The strip body may also incorporate a removable strip connector having a first end with a first nodule disposed thereon and a second end, opposite the first of the removable strip connector, with a second mushroom-shaped nodule disposed thereon, the first and second mushroom-shaped nodules each with a first thickness greater than a diameter of each aperture defined by the respective first strip body and second strip body, wherein the first strip body and a second strip body are removably couplable together with the removable strip connector.

In accordance with a further feature of the present invention, the bottom surface of the first strip body and the second strip body each respectively define a channel sized to receive and house a width and a thickness of a length of the removable strip connector.

Although the invention is illustrated and described herein as embodied in an animal deterrent spiked strip, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the mat (if having an elongated direction).

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 7 is a downward-looking perspective and close-up view of two body sections of strip body hingedly coupled together in accordance with one embodiment of the present invention;

FIG. 8 is a downward-looking perspective and close-up view of a strip body having a hinged snap tab in accordance with one embodiment of the present invention;

DETAILED DESCRIPTION

Figure 1:
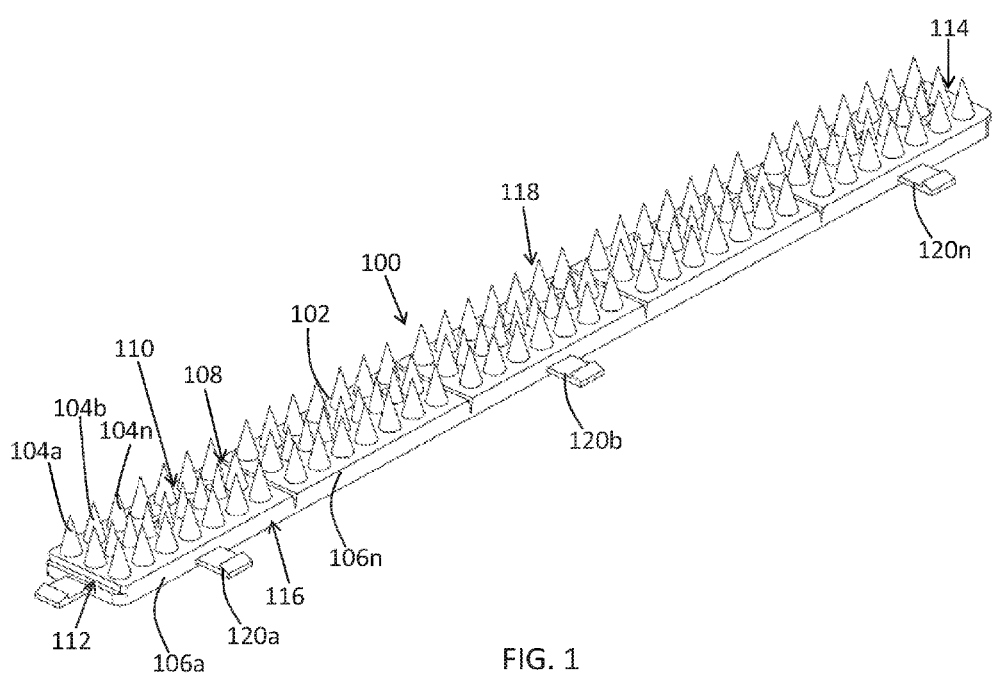
FIG. 1 is a downward-looking perspective view of a strip body forming part of an animal deterrent spiked-strip assembly in accordance with one embodiment of the present invention.
Figure 2:
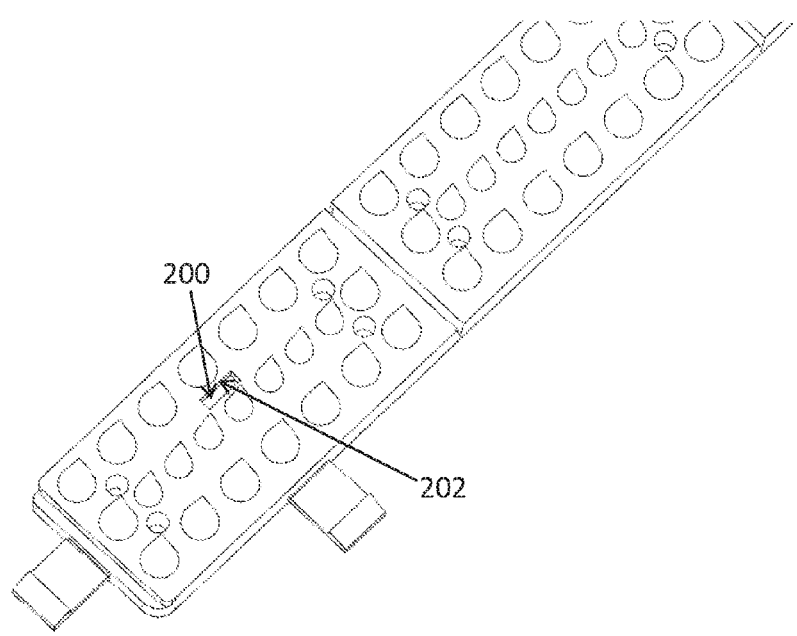
FIG. 2 is a partial close-up view of the upper surface of the strip body of FIG. 1.
Figure 3:
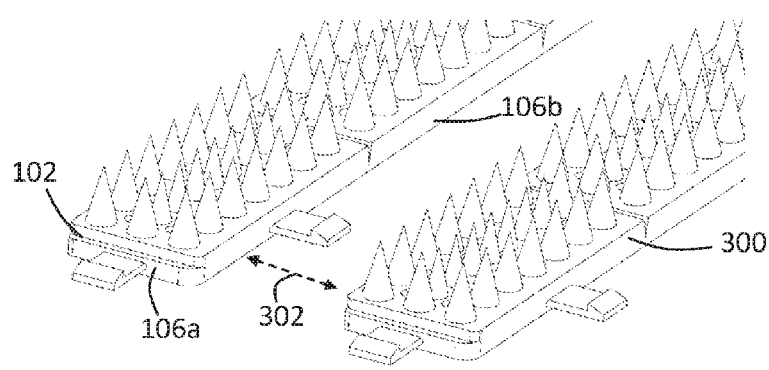
FIG. 3 is a downward-looking perspective view of two strip bodies forming part of an animal deterrent spiked-strip assembly in accordance with another embodiment of the present invention.
Figure 4:
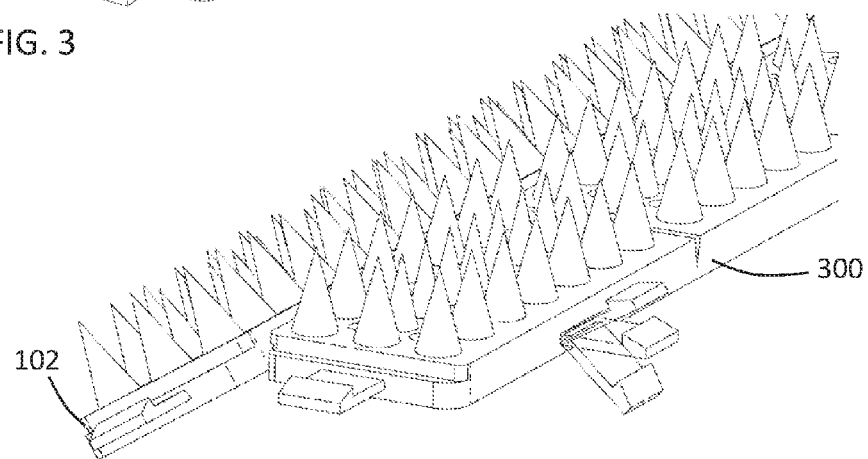
FIG. 4 depicts the two strip bodies of FIG. 3 coupled together.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient animal deterrent spiked strip assembly that safely and effectively can accommodate various topographies and deter a variety of species of animals. Embodiments of the invention also provide a means to vary the shape and size of the spiked-strip assembly while still maintaining a device that can effectuate the deterrent goal and minimize the risk of any animals successfully tampering with the device.

Referring now to FIG. 1, one embodiment of the present invention is shown in a perspective downward-looking view. FIG. 1 shows several advantageous features of the present invention, but, as will be described below, the invention can be provided in several shapes, sizes, combinations of features and components, and varying numbers and functions of the components. The first example of an animal deterrent spiked-strip assembly 100, as shown in FIG. 1, includes a strip body 102 and a plurality of polymer-based spikes 104a-n, wherein "n" represents any number greater than 1. The strip body 102 may advantageously define a first and a second (i.e., at least a plurality) of substantially planar, unitary, and flexible body sections 106a-n, wherein each body section 106a-n is hingedly coupled to one another about a joint, e.g., joint 108. As such, the device 100 can effectively navigate over various surface level differentiations and topography as illustrated in FIG. 7.

One exemplary illustration of the hingedly coupled configuration of the sections 106a-n in a flexed state can be seen in FIG. 7. The sections 106a-n can be hingedly coupled through use of a separate hinge-like structure or through material of the body sections 106a-n when joined together. The sections 106a-n are "unitary" in that they are permanently coupled together and operate as one piece. The body sections 106a-n may be of an elastically rigid, yet flexible, polymer material such as natural rubber having a Shore A hardness ranging from approximately 25-60. Other materials (whether polymeric or otherwise) and hardnesses may also be utilized depending on the design specifications and applications for the device 100. Furthermore, the plurality of polymer-based spikes 104a-n may also be made from the same material as the body sections 106a-n. The spikes 104a-n may also be of a more rigid material than the body sections 106a-n, e.g., a Shore A hardness ranging from approximately 50-90. In one embodiment, the strip body 102 and spikes 104a-n may be compression or injection molded, while in other embodiments the strip body 102 and spikes 104a-n may be joined together using other manufacturing methods such as using fasteners, adhesives, or welding. In one embodiment, the spikes 104a-n perpendicularly extend from the substantially planar profile, or upper surface 110 to which they are attached, of the respective strip body 102.

Figure 5:
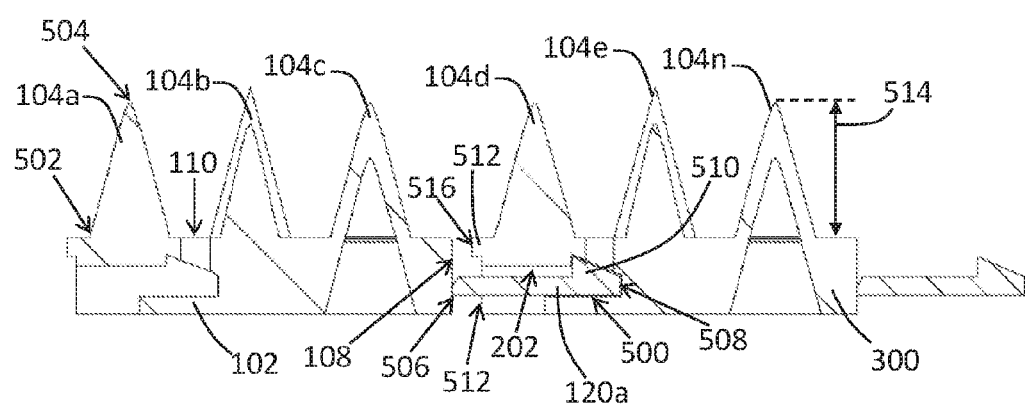
FIG. 5 is a cross-sectional view of the two strip bodies of FIG. 3 coupled together in accordance with one embodiment of the present invention.

Each of the body sections 106a-n have an upper surface 110, a bottom surface 1300 (best shown in FIG. 13) opposing the upper surface 110, a front end 112, a rear end 114, a left side 116, and a right side 118. Of course, the above naming nomenclature may vary based on the user's perspective. The end 112, 114 or sides 116, 118 may advantageously have a shiplap configuration for effective and efficient spatial coupling of two or more strip bodies 102. The strip body 102 may have a longitudinal length separating the front and rear ends 112, 114 of approximately 6"-3', a width separating the left and right sides 116, 118 of approximately 3"-12", and a thickness separating the upper and bottom surfaces 110, 1300 of approximately 0.5"-2". As best shown in FIG. 5, the height 514 of the spikes 104a-n may be approximately 1"-3". Dimensional variations outside of the aforementioned may occur depending on the design specifications and applications for the device 100.

With specific reference to FIGS. 1 and 5, the plurality of polymer-based spikes 104a-n may include a base portion 502 coupled to the upper surface 110 of each of the body sections 106a-n, a blunt tip portion 504 opposing the base portion 502. The spikes 104a-n may also be of a conical shape to effectuate a structure that is difficult to flex with respect to the body section 106a-n, thereby minimizing the likelihood of the target animal circumventing the purpose of the device 100. Unlike many of the known spike-mats used to deter animals, the present invention utilizes a blunt tip 504 that is worn down and/or rounded so as to prevent injury to the target animal. Said another way, the tip 504 is not sharp and does not come to a fine point. The conical shape of the polymer-based spikes 104a-n spans along a portion of the height 514 and terminally ends at the tip 504. The spikes 104a-n are arranged on the respective body sections 106a-n in a uniform and tightly spaced configuration. Said another way, the spikes 104a-n are substantially equal in spacing (+/−0.5") from one another and are no greater than 1.5" apart (both measured from base-to-base of spikes 104a-n).

One or more body sections 106a-n may also include one or more snap tabs 120a-n disposed one or more of the sides 116, 118 thereof. Preferably, one side, e.g., 116. includes tabs 120a-n and the opposing side, e.g., 118, includes tab channels, e.g., shown best in FIG. 5 as element 500. The channels 500 are preferably aligned in location along the longitudinal length of the body 102 with the tabs 120a-n. In one embodiment, there may be a tab 120a and corresponding channel 500 on opposite sides 116, 118 of every other body section 106a-n. In other embodiments, there may be a tab 120a and corresponding channel 500 on opposite sides 116, 118 of every body section 106a-n, on the front and rear body sections 106a, 106n, or other configuration. The snap tabs 120a-n and channels 500 facilitate in providing a flexible device 100 that may adapt to various surface widths and for various surface topographies. To do so, the invention contemplates using two or more additional strip bodies that are joinable with the first strip body 102 using the aforementioned tabs 120a-n and corresponding channels 500. Of course, the additional strip bodies may utilize the features and have the same configuration as the first strip body 102, and vice versa.

Specifically, with reference to FIGS. 2-5, a first strip body 102 and a second strip body 300 are depicted. The strip bodies 102, 300 are independent of one another in that they are not permanently coupled together and stand on their own should the user desire. The snap tabs 120a-n may have a proximal end 506 hingedly coupled to the left side 116 of the one of the plurality of body sections 106a-n and a distal end 508 opposite the proximal end 506. The snap tabs 120a-n may also have a flange 510 disposed along a tab length separating the proximal and distal ends 506, 508 of the snap tabs 120a-n. The tabs 120a-n are configured such that it may be inserted into the tab channel 500, which, as seen in FIG. 5, is defined at least partially by the right side 518 of the second strip body 300. The channel 500 is sized to receive and house the correspondingly snap tab(s) 120a-n. Said another way, the channel 500 may be substantially the same (+/−0.3"), or slightly less, width and thickness than the width and thickness of the snaps 120a-n. The second body 300 may also include one or more recessed walls 202 (shown best in FIG. 2) shaped to receive the flange 510 of the snap tab 120a-n and disposed within the tab channel 500. The strip bodies 102, 300 may be coupled together through one or more fasteners described herein by pushing the two bodies 102, 300 together (represented with arrow 302).

In one embodiment, the material of the body 102 forming the channel 500 is of an elastic material that can deform in shape to accommodate the tab(s) 120a-n. Beneficially, the upper surface of the body 102, or body section 106a-n, may also define an upper aperture 200 (shown in FIG. 2) that is spatially coupled with the tab channel 500, wherein the upper aperture 200 is sized to receive the flange 510 of the snap tab 120a-n. Said another way, the tab(s) 120a-n are operable to be placed within the channel 500 until the one wall of the flange 510 is disposed in an adjacent configuration with a wall of the body 102 that facilitates in forming the aperture 200. An opposing strip body 300 may contain an overhang member 512 disposed at the upper portion of the second strip body 300. The overhang member 512 advantageously spaces the two strip bodies 102, 300 the appropriate distance apart from one another such that there is minimal (if any) gap between the two bodies 102, 300 and such that the flange 510 is disposed at least partially in the aperture 200 once inserted within the channel 500. The overhang member 512 also permits the two bodies 102, 300 to flex in relation to one another, as depicted best in FIG. 6, while preventing and/or inhibiting an animal from tampering with the snap tab(s) 120a-n. To accommodate a quick and effective decoupling of the strip bodies 102, 300, the user may beneficially have access to the flange 510 through the aperture 200 to release the snap 120a-n from the corresponding channel 500 and disconnect the two bodies 102, 300. The overhang member 512 also includes a distal terminal end 516.

Figure 6:
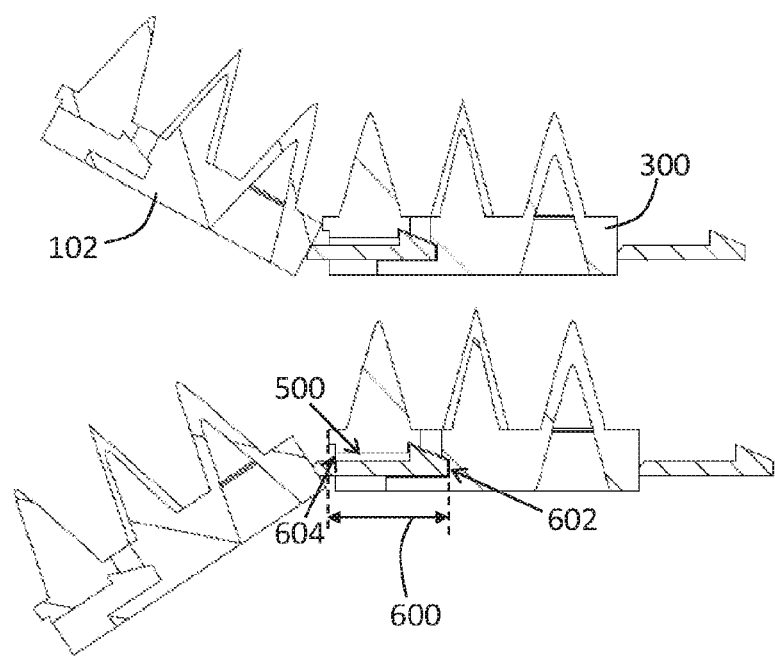
FIG. 6 depicts two cross-sectional views of the two strip bodies of FIG. 3 coupled together and hingedly placed in various positions.

With brief reference to FIGS. 5-6, the tab channel 500 has a tab channel length 600 separating a distal end 602 of the tab channel 500 and a proximal end 604 of the tab channel 500. The proximal end 604 of the tab channel 500 opposes the distal end of the tab channel 500. In some embodiments, the tab length separating the proximal and distal ends 506, 508 of the tab 120a-n equals (which is defined as "substantially" equal) the length 600 separating the distal end 602 of the tab channel 500 and the distal terminal end 516 of the overhang member 512. FIG. 6 depicts the exemplary vertical flexibility capability of the bodies 102, 300 when coupled together.

With reference to FIG. 8, a snap tab 800 may also include a hinge 802 disposed along the tab length 804 separating the proximal end 806 of the snap tab 800 and the flange 808 of the snap tab 800. The hinge 802 facilitates in providing increased flexibility and adaptability to the strip 100 when the two or more strip bodies 102, 300 are coupled together. Therefore, the device 100 can more effectively accommodate various surface topographies. The hinge 802 may be disposed a median distance of the tab length 804 or another length to permit flexibility of the two or more strip bodies 102, 300.

Figure 9:
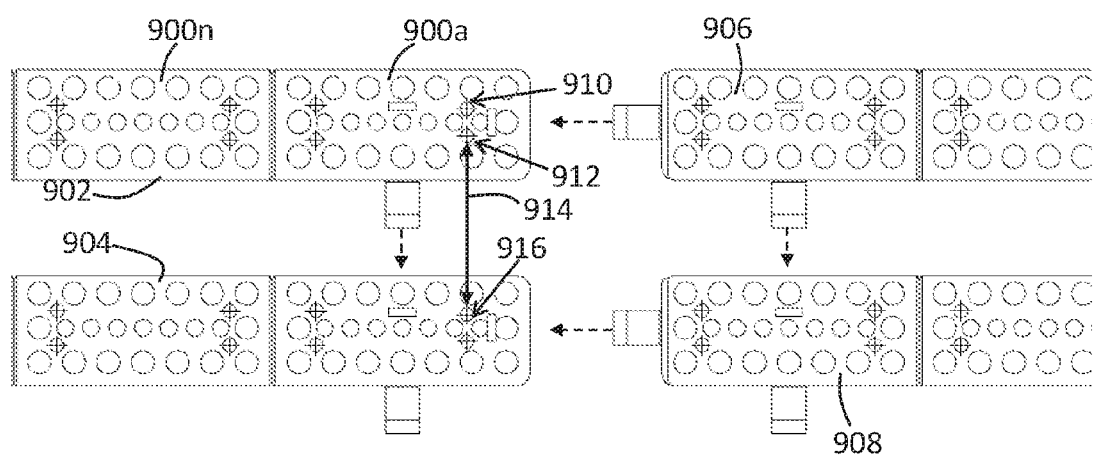
FIG. 9 is a top plan view of four strip bodies forming part of an animal deterrent spiked-strip assembly in accordance with one embodiment of the present invention.

With reference to FIGS. 9-13, one or more of the body sections 900a-n of the two or more bodies 902, 904 may also define a plurality of apertures 910, 912, each respectively interposed between two of the plurality of polymer-based spikes. This configuration can be seen exemplified best in FIG. 13, wherein the spikes 1000, 1002 flank aperture 912 and spikes 1002, 1004 flank aperture 910. One or more flexible and potentially removable strip connectors 1006 may be employed in combination with the apertures in order to couple two or more strip bodies together. Using the strip connector 1006 as an example, shown best in FIGS. 11-12, said connector has a first end 1100 with a first nodule disposed 1102 thereon and a second end 1104, opposite the first end 1100 of the removable strip connector 1006, with a second mushroom-shaped nodule 1106 disposed thereon. The first and second mushroom-shaped nodules 1102, 1106 each have a first thickness, e.g., thickness represented with arrow 1200 in FIG. 12, greater than a diameter of each of the plurality of apertures (as best seen in FIG. 9). The first and second mushroom-shaped nodules may each have a second thickness, e.g., thickness represented with arrow 1202 in FIG. 12, less than the first thickness 1200 and less than diameter of each of the plurality of the apertures 910, 912. In other embodiments, the second thickness 1202 is substantially equal (+/− approximately 1/16 of an inch) to the diameter of the apertures 910, 912. Said another way, the nodules 1102, 1106 may have respective seats for the surface periphery of the body section defining the aperture in which the nodules 1102, 1106 are to be inserted. The difference in thickness of the nodule(s) results in a secure connection between the nodule and the respective body section to which it is coupled. While the nodules 1102, 1106 are depicted as mushroom-shaped, they may be of other shapes and sizes. In other embodiments, the second thickness 1202 may be greater than the diameter of the aperture 910 if the material of the body 102 defining the aperture 910 is of an elastic property. The one or more apertures 910, 912 may be circular, oblong, or other shape.

As seen best in FIG. 9, multiple bodies 902, 904, 906, 908 may be employed to form a singular device that conforms to various surface areas and/or topographies. The one or more bodies 902, 904, 906, 908 may be coupled together with the aforementioned snap tab(s) 120a-n and/or strip(s) 1006. The snaps 120a-n and/or strip(s) 1006 may be placed on one or more sides and ends of each of the bodies 902, 904, 906, 908 to form a singular unit where each of the bodies 902, 904, 906, 908 are operating in tandem with one another. Preferably, only one end and side of one of the bodies 902, 904, 906, 908 have a snap tab(s) 120a-n, wherein the opposing side and end of another of the bodies 902, 904, 906, 908 has the recess in which the snap tab(s) 120a-n may be inserted. The apertures where the nodules are inserted through may be disposed substantially adjacent (within 5-10% the total longitudinal length away from the end) to the opposing ends of two of the bodies 902, 904, 906, 908 to ensure two or more bodies 902, 904, 906, 908 do not decouple from one another should they be tampered with by an animal.

When two or more bodies 902, 904, 906, 908 are coupled together, a first mushroom-shaped nodule 1102 may be interposed between the upper surface 1012 of one of the plurality of body sections, e.g., 1008, of the strip body and the tips, e.g., tips 1014, 1016, of two of the plurality of polymer-based spikes 1002, 1004 defining one of the plurality of apertures 910 interposed therein-between. This configuration can be specifically seen depicted in the top half of FIG. 10. Similar to the first nodule, a second mushroom-shaped nodule 1106 may also interposed between the upper surface 1012 of one of the plurality of second body sections of the second strip body and the tips of the two of the second plurality of polymer-based spikes defining one of the second plurality of apertures interposed therein-between. The location of the nodules is beneficial in that it inhibits an animal from having access to it, thereby reducing the possibility of the assembly 100 not being effective.

Figure 10:
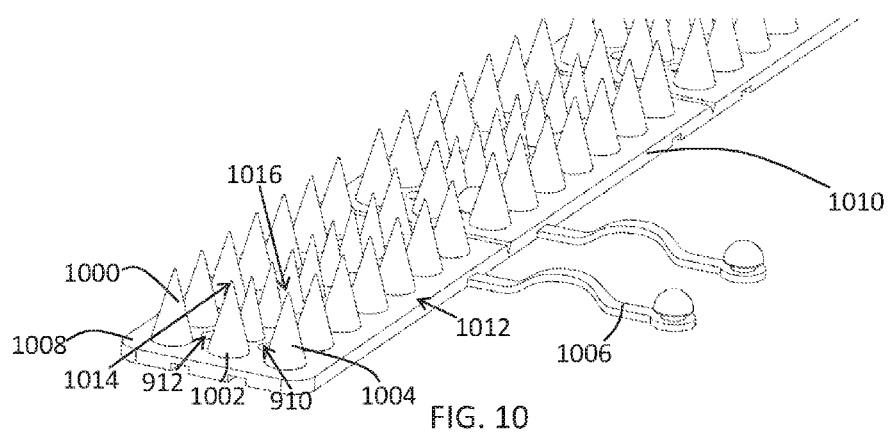
FIG. 10 is a downward-looking perspective view of a strip body having strip connectors in accordance with one embodiment of the present invention.
Figure 13:
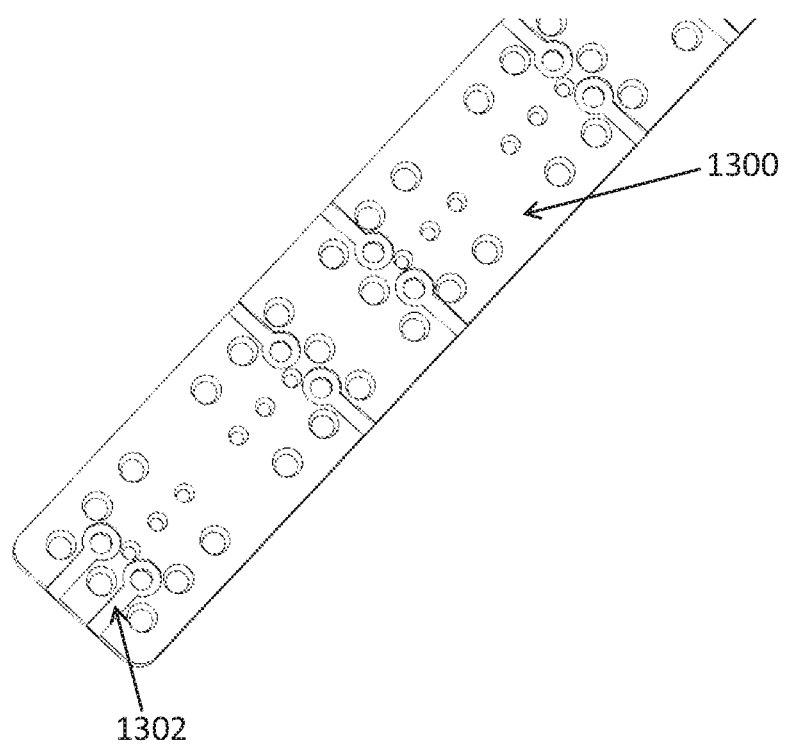
FIG. 13 depicts downward-looking and upward-looking perspective views of a strip body in accordance with one embodiment of the present invention.
Figure 14:
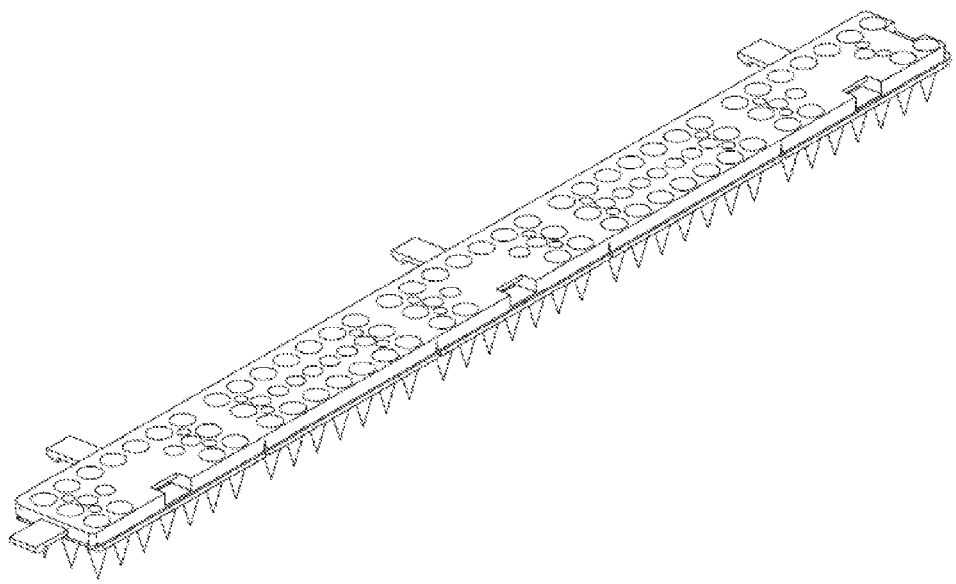
FIG. 14 depicts a downward-looking perspective view of the bottom surface of the strip body of FIG. 1.
Figure 15:
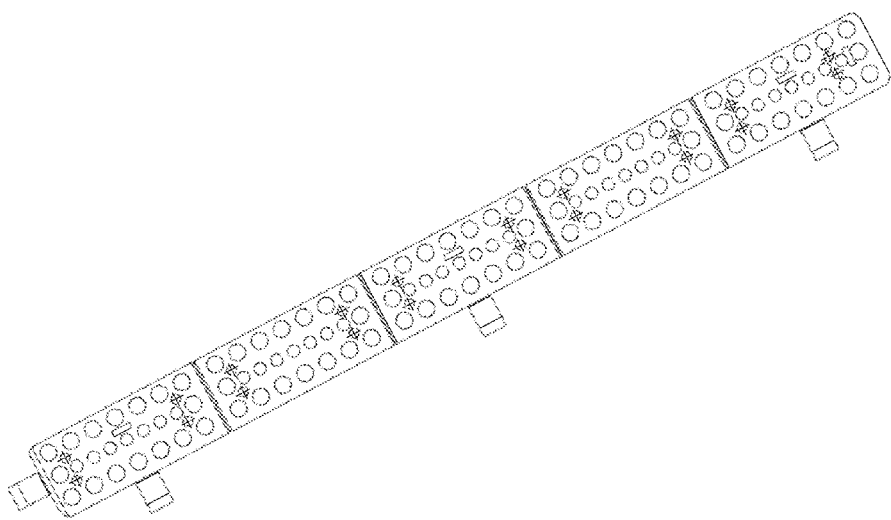
FIG. 15 depicts a bottom plan view of the bottom surface of the strip body of FIG. 1.
Figure 16:
FIG. 16 depicts an elevational left-side view of the strip body of FIG. 1.
Figure 17:
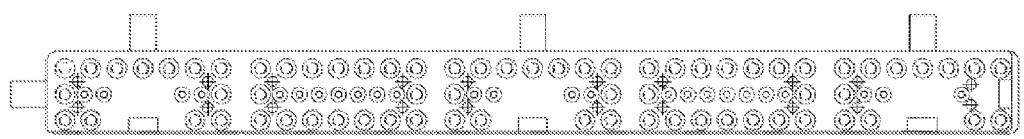
FIG. 17 depicts a top plan view of the strip body of FIG. 1.
Figure 18:
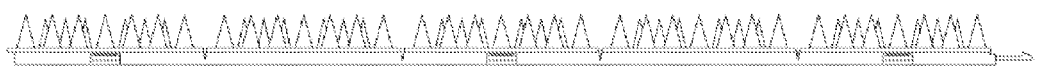
FIG. 18 depicts an elevational right-side view of the strip body of FIG. 1.
Figure 19:
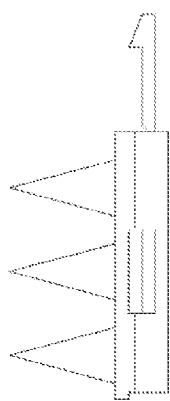
FIG. 19 depicts an elevational front-end view of the strip body of FIG. 1.
Figure 20:
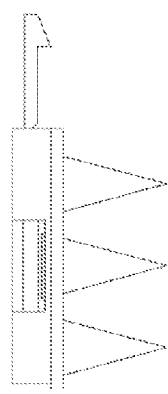
FIG. 20 depicts an elevational rear-end view of the strip body of FIG. 1.

With reference specifically to FIGS. 10 and 13, the bottom surface 1300 of one of the plurality of body sections 1008, 1010 may define a channel or groove 1302 sized to receive and house a width (represented with arrow 1108) and a thickness (represented with arrow 1108) of a length (represented with arrow 1110) of the removable strip connector 1006. The channel 1302 provides sufficient space for the strip connector 1006 to be recessed therein and ensure a substantially planar bottom surface 1300. The strip connectors 1006 may be removable (as shown in FIG. 13) so that they are not required when only one of the bodies 902, 904, 906, 908 (FIG. 9) is desired. Said another way, the bottom surfaces 1300 of the one or more strip bodies 902, 904, 906, 908 (FIG. 9), when coupled together with the removable strip connector(s) 1006, are operably configured to be substantially planar and/or aligned with one another. This substantially planar configuration is particularly beneficial when the target surface that is going to be overlaid with the device 100 is substantially planar, thereby reducing the risk that an animal will be able to tamper with the device 100.

Figure 11:
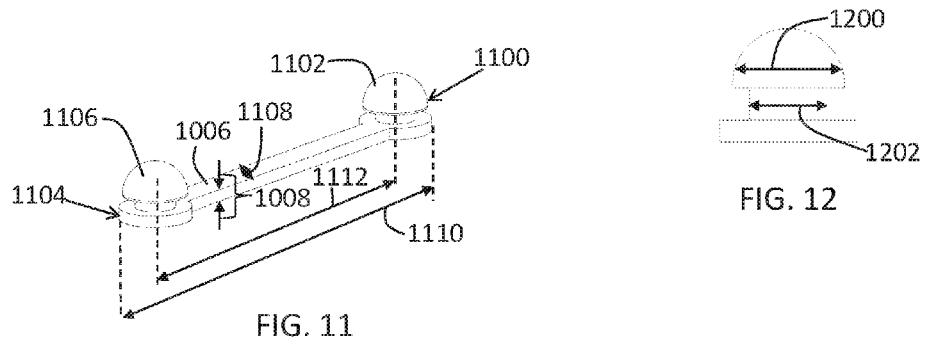
FIG. 11 is a perspective view of a strip connector shown in FIG. 10.
Figure 12:
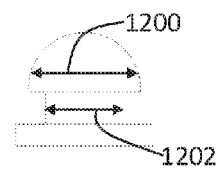
FIG. 12 is a cross-sectional view of an end of the strip connector shown in FIG. 11.

In one embodiment as best shown in FIG. 11, the strip connector 1006 includes an effective length (represented by arrow 1112) separating a first central axis defined by the first mushroom-shaped nodule 1102 and a second central axis defined by the second mushroom-shaped nodule 1106. To ensure two bodies are alleged and substantially adjacent to one another when coupled together, the effective length 1112 is of a same value (i.e., +/−1/16 of an inch) of a length (represented by arrow 914 in FIG. 9) separating a center axis defined by the one of the plurality of apertures 912 on the first strip body 902 and a center axis defined by the one of the second plurality of apertures, e.g., 916, on second strip body 904. Preferably, it will be the two closest aligned apertures, 912, 916, that define the length 914 in which the effective length 1112 of the strip connector 1006 is substantially of the same value. The equivalent value of the length 1112 with respect to the length 914 should be measured with respect to the installed position of the strip connector 1006, as it is envisioned that in one embodiment the strip connector 1006 could be of a material having elastic properties.

An animal deterrent spiked-strip assembly has been disclosed that effectively and efficiently spans various surface areas and topographies. The assembly also safely and effectively deters feral and/or wild animals without risk of substantial bodily harm or injury that many users find desirable.

What is claimed is:

1. An animal deterrent spiked-strip assembly comprising:
 a strip body, defining a first and a second substantially planar, unitary, and flexible body section hingedly coupled to one another about a joint and each including an upper surface, a bottom surface opposing the upper surface, a front end, a rear end, a left side, and a right side, at least one of the first and second body sections of the strip body having:
  a snap tab with a proximal end hingedly coupled to the left side of the at least one of the first and second body sections and a distal end, opposite the proximal end, wherein the snap tab includes a flange disposed along a length of the snap tab separating the proximal and distal ends of the snap tab; and
a tab channel defined at least partially by the right side of the one of the first and second body sections and sized to receive and house the snap tab; and
an upper aperture defined by the upper surface of the one of the first and second body sections and spatially coupled with the tab channel, the upper aperture sized to receive the flange of the snap tab; and
a plurality of polymer-based spikes, each with a base coupled to the upper surface of each of the first and second body sections, a rounded tip opposing the base, and of a conical shape, the plurality of polymer-based spikes arranged on the respective body sections in a uniform and tightly spaced configuration.

2. The animal deterrent spiked-strip assembly according to claim 1, wherein:
the first and second body sections each respectively define an aperture respectively interposed between two of the plurality of polymer-based spikes disposed thereon.

3. The animal deterrent spiked-strip assembly according to claim 2, further comprising:
a flexible removable strip connector having a first end with a first mushroom-shaped nodule disposed thereon and a second end, opposite the first end of the removable strip connector, with a second mushroom-shaped nodule disposed thereon, the first and second mushroom-shaped nodules each with a first thickness greater than a diameter of each of the plurality of apertures of the respective first and second body sections.

4. The animal deterrent spiked-strip assembly according to claim 3, wherein:
the bottom surface of at least one of the first and second body sections defining a channel sized to receive and house a width and a thickness of a length of the removable strip connector.

5. The animal deterrent spiked-strip assembly according to claim 3, wherein:
the first and second mushroom-shaped nodules each have a second thickness less than the first thickness of the respective first and second mushroom-shaped nodules and substantially equal to the diameter of each of the plurality of apertures.

6. The animal deterrent spiked-strip assembly according to claim 5, further comprising:
a second strip body, defining a first and a second substantially planar, unitary, and flexible second body sections, each of the second body sections hingedly coupled to one another about a joint, defining at least one second body aperture, and including an upper surface, a bottom surface opposing the upper surface of each of the first and second second body sections, a front end, a rear end, and a left side, and a right side; and
a second plurality of polymer-based spikes, each with a base coupled to the upper surface of each of the first and second second body sections, a blunt tip opposing the base of the second plurality of polymer-based spikes, and of a conical shape, the second plurality of polymer-based spikes arranged on the respective second body sections in a uniform and tightly spaced configuration and two of the second plurality of polymer-based spikes arranged on the respective second body sections flanking the at least one second body aperture defined thereon,
the strip body and the second strip body are removably coupled together with the removable strip connector.

7. The animal deterrent spiked-strip assembly according to claim 6, wherein:
the bottom surfaces of the strip body and the second strip body, when coupled together with the removable strip connector, are operably configured to be substantially planar.

8. The animal deterrent spiked-strip assembly according to claim 1, wherein the snap tab further comprises:
a hinge disposed along the tab length separating the proximal end of the snap tab and the flange of the snap tab.

9. The animal deterrent spiked-strip assembly according to claim 1, wherein the one of the first and second body sections of the strip body further comprises:
a recessed wall shaped to receive the flange of the snap tab and disposed within the tab channel, the tab channel including a tab channel length separating a distal end of the tab channel and a proximal end of the tab channel, the proximal end of the tab channel opposing the distal end of the tab channel; and
an overhang member disposed on the right side of the one of the first and second body sections and having a distal terminal end, wherein the tab length equals the length separating the distal end of the tab channel and the distal terminal end of the overhang member.

10. An animal deterrent spiked-strip assembly comprising:
a first strip body and a second strip body, each independent of another and respectively:
of substantially planar profile;
of a flexible material;
having an upper surface, a bottom surface opposing the upper surface, a front end, a rear end, a left side, and a right side opposing the left side; and
defining an aperture, spanning from the upper surface of the strip body to the bottom surface of the strip body, aligned with one another;
a plurality of polymer-based spikes:
coupled to the upper surface of the respective first strip body and a second strip body;
each perpendicularly extending from the substantially planar profile of the respective first strip body and second strip body to which the plurality of polymer-based spikes are attached and spanning conically to a blunt tip; and
arranged on the respective body sections in a uniform and tightly spaced configuration; and
a removable strip connector having a first end with a first mushroom-shaped nodule disposed thereon and a second end, opposite the first end of the removable strip connector, with a second mushroom-shaped nodule disposed thereon, the first and second mushroom-shaped nodules each with a first thickness greater than a diameter of each aperture defined by the respective first strip body and second strip body, wherein the first strip body and a second strip body are removably couplable together with the removable strip connector inserted through the aperture defined by each of the respective first strip body and second strip body and with the first and second mushroom-shaped nodules disposed over the upper surface of the respective first and second strip bodies.

11. The animal deterrent spiked-strip assembly according to claim 10, wherein:
each aperture defined by the respective first strip body and second strip body are interposed between two of the plurality of polymer-based spikes on each respective first strip body and second strip body.

12. The animal deterrent spiked-strip assembly according to claim 10, wherein:
the first strip body and second strip body each respectively define a plurality of substantially planar, unitary, and flexible body sections hingedly coupled to one another about a joint.

13. The animal deterrent spiked-strip assembly according to claim 10, wherein:
the first and second mushroom-shaped nodules each have a second thickness less than the diameter of each aperture defined by the respective first strip body and second strip body.

14. The animal deterrent spiked-strip assembly according to claim 10, wherein:
the bottom surface of the first strip body and the second strip body each respectively define a channel sized to receive and house a width and a thickness of a length of the removable strip connector.

15. An animal deterrent spiked-strip assembly comprising:
a substantially planar and flexible strip body having an upper surface, a bottom surface opposing the upper surface, a front end, a rear end, a left side, a right side, and having a snap tab with a proximal end hingedly coupled to the strip body and a distal end, opposite the proximal end, wherein the snap tab includes a flange disposed along a tab length separating the proximal and distal ends of the snap tab, the substantially planar and flexible strip body having:
an upper surface area defined by the front end, rear end, left side, and right side of the strip body;
a tab channel defined at least partially by the right side of the strip body and sized to receive and house the snap tab; and
an upper aperture defined by the upper surface of the strip body and spatially coupled with the tab channel, the upper aperture sized to receive the flange of the snap tab; and
a plurality of polymer-based spikes, each with a base coupled to the upper surface of the strip body, a rounded tip opposing the base, and of a conical shape, the plurality of polymer-based spikes arranged on the strip body in a uniform and tightly spaced configuration over the upper surface areas.

\* \* \* \* \*